United States Patent [19]
Wohlhüter

[11] Patent Number: 5,626,435
[45] Date of Patent: May 6, 1997

[54] COUPLING ASSEMBLY

[75] Inventor: Gerhard Wohlhüter, Munich, Germany

[73] Assignee: Rockinger Spezialfabrik fur Anhangerkupplungen GmbH & Co., Munich, Germany

[21] Appl. No.: 481,431
[22] PCT Filed: Oct. 29, 1993
[86] PCT No.: PCT/EP93/03029
    § 371 Date: Jun. 14, 1995
    § 102(e) Date: Jun. 14, 1995
[87] PCT Pub. No.: WO95/11811
    PCT Pub. Date: May 4, 1995
[51] Int. Cl.⁶ .................................. B60D 1/56
[52] U.S. Cl. .............. 403/348; 280/416.1; 280/504; 403/319; 403/326
[58] Field of Search .............. 280/416.1, 504; 403/315, 319, 326, 348

[56] References Cited

U.S. PATENT DOCUMENTS

| | | | |
|---|---|---|---|
| 2,133,065 | 10/1938 | Weber | 280/504 |
| 3,860,209 | 1/1975 | Strecker | 403/348 X |
| 3,891,237 | 6/1975 | Allen | 280/416.1 X |
| 4,836,707 | 6/1989 | Myers | 403/325 X |
| 5,088,853 | 2/1992 | Reid | 403/348 X |
| 5,297,407 | 3/1994 | Tarr | 280/507 X |

FOREIGN PATENT DOCUMENTS

| | | |
|---|---|---|
| 0160934 | 11/1985 | European Pat. Off. . |
| 0310204 | 4/1989 | European Pat. Off. . |
| 0383394 | 8/1990 | European Pat. Off. . |
| 456985 | 11/1991 | European Pat. Off. ............ 280/504 |
| 546980 | 6/1993 | European Pat. Off. ............ 280/504 |
| 0568921 | 11/1993 | European Pat. Off. . |
| 2697471 | 5/1994 | France ............................ 280/504 |
| 3419322 | 11/1985 | Germany . |
| 3416631 | 11/1985 | Germany . |
| 3421174 | 12/1985 | Germany . |
| 3512981 | 10/1986 | Germany . |
| 3601505 | 7/1987 | Germany . |
| 3710772 | 10/1988 | Germany . |
| 4214823 | 11/1993 | Germany . |
| 61-50807 | 3/1986 | Japan . |
| 795984 | 1/1981 | U.S.S.R. ......................... 280/504 |
| 2205291 | 12/1988 | United Kingdom .............. 280/504 |
| WO8403666 | 9/1984 | WIPO . |

OTHER PUBLICATIONS

Brochure of MFK Maschinenfabrick Kraeft GmbH #150.

*Primary Examiner*—Brian K. Green
*Assistant Examiner*—Andrea Chop
*Attorney, Agent, or Firm*—Brumbaugh, Graves, Donohue & Raymond

[57] ABSTRACT

A coupling assembly has two coupling elements arranged to interlock in a coupled position and release in a release position. A displaceable securing element on one of the coupling elements engages and holds the other coupling element in the coupled position, the securing element being biassed into such engagement. When the coupling elements are being coupled to each other, the securing element is displaced against the bias to enable movement of the coupling elements to the interlocking coupled position. When the coupling elements reach the coupled position, the securing element is displaced automatically under the bias to the engaging position to prevent unintentional release of the coupling elements from the coupled position.

15 Claims, 8 Drawing Sheets

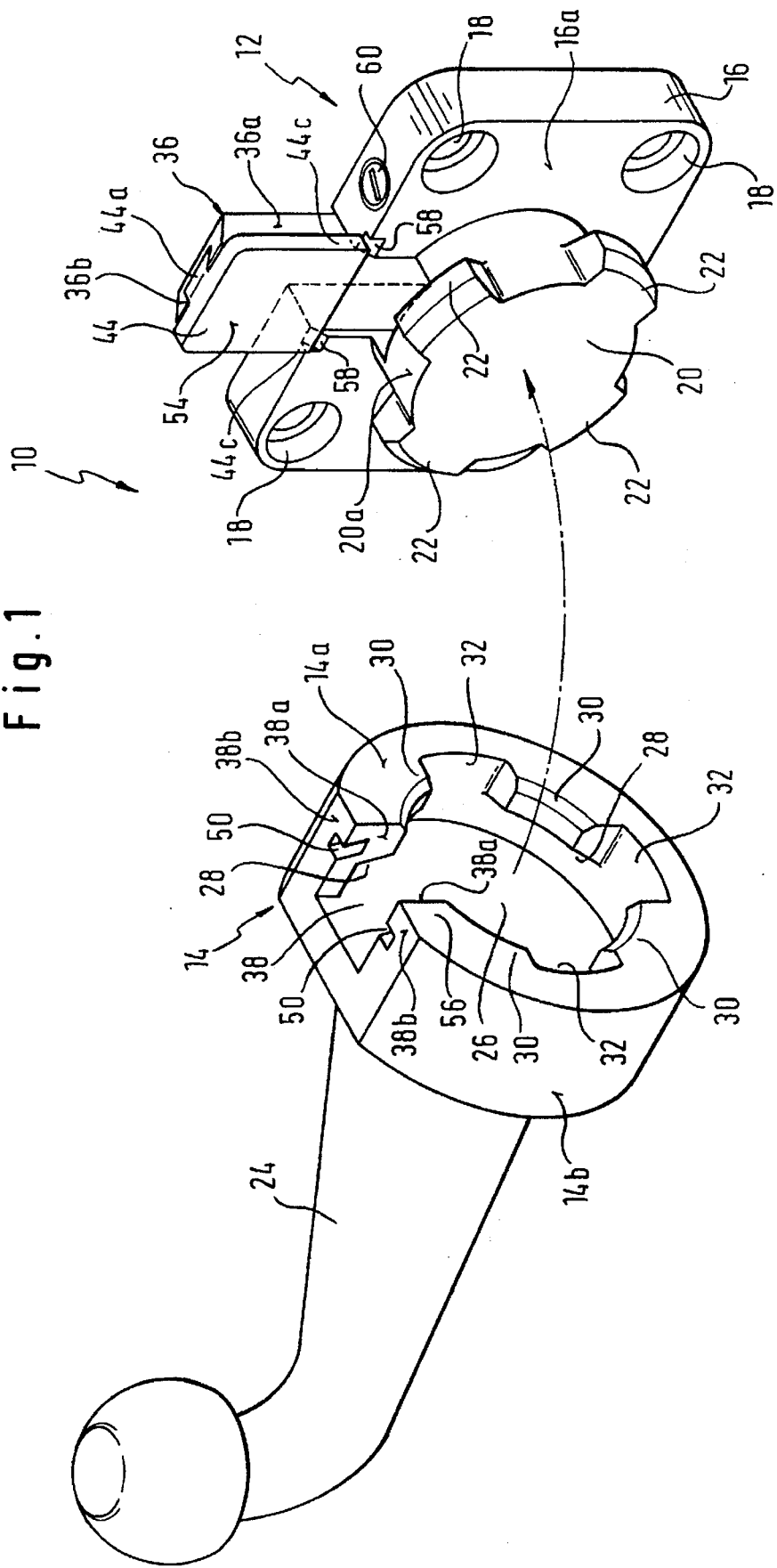

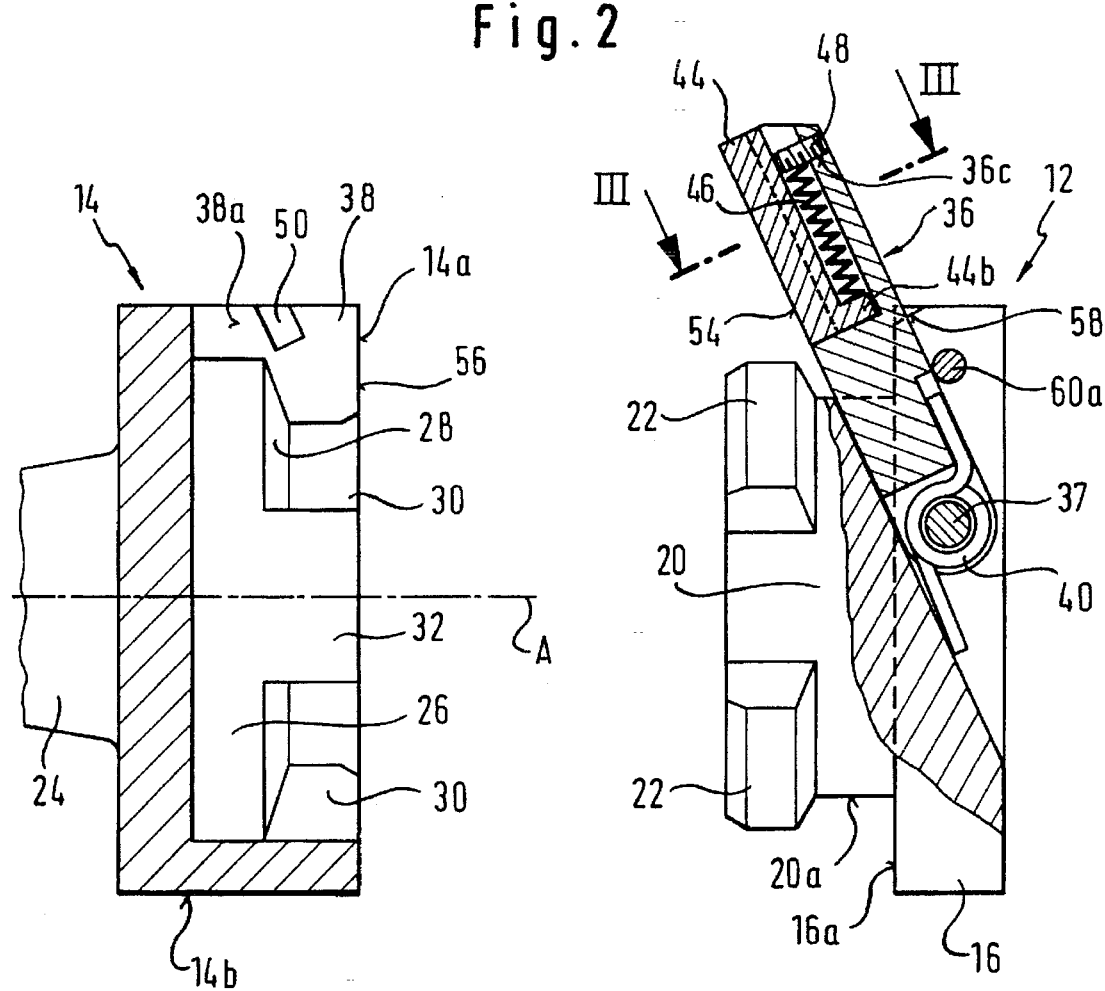

Fig. 8
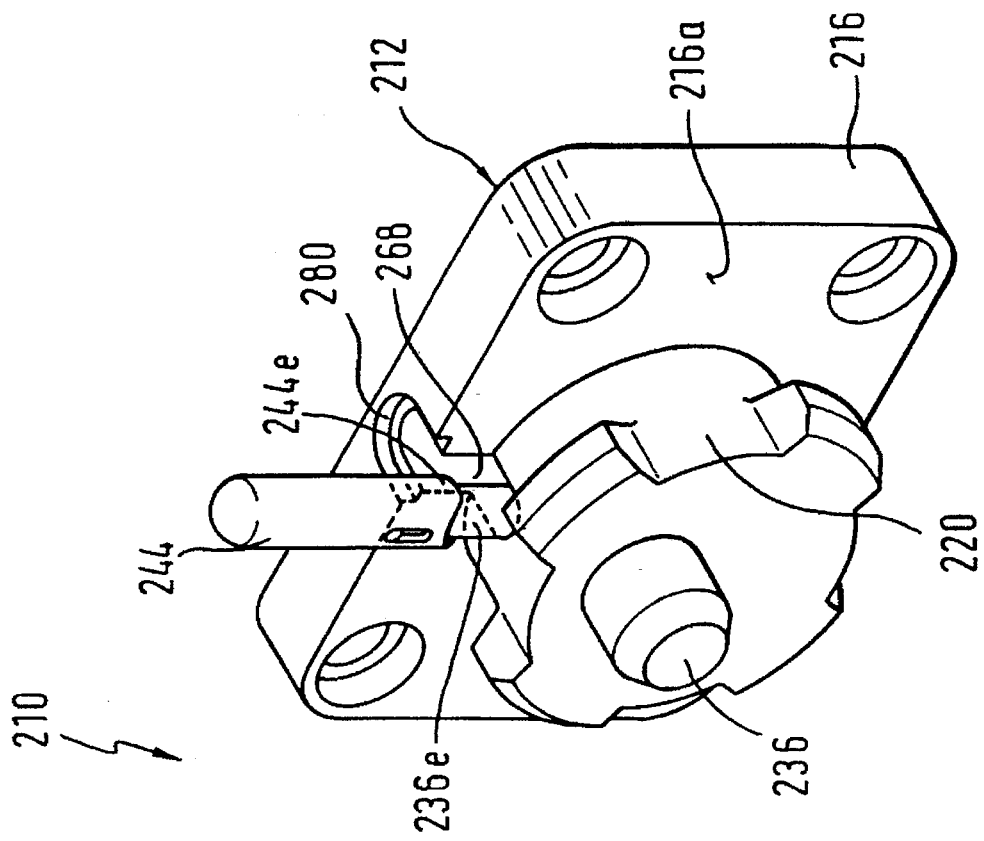
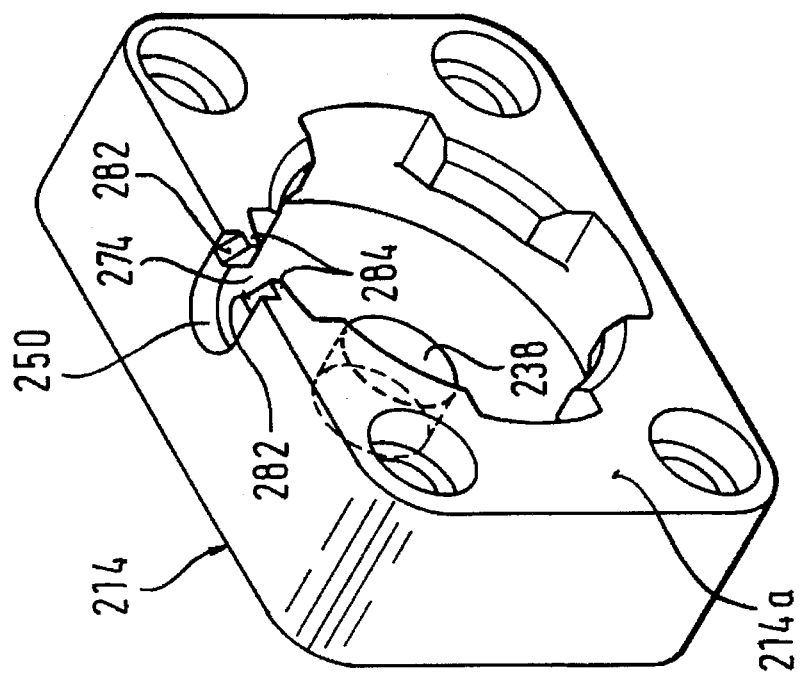

Fig. 10
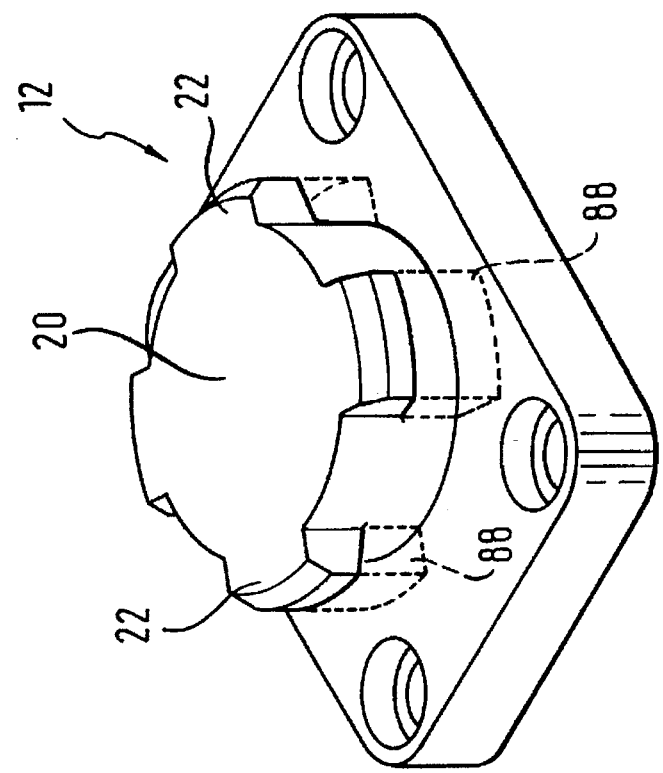
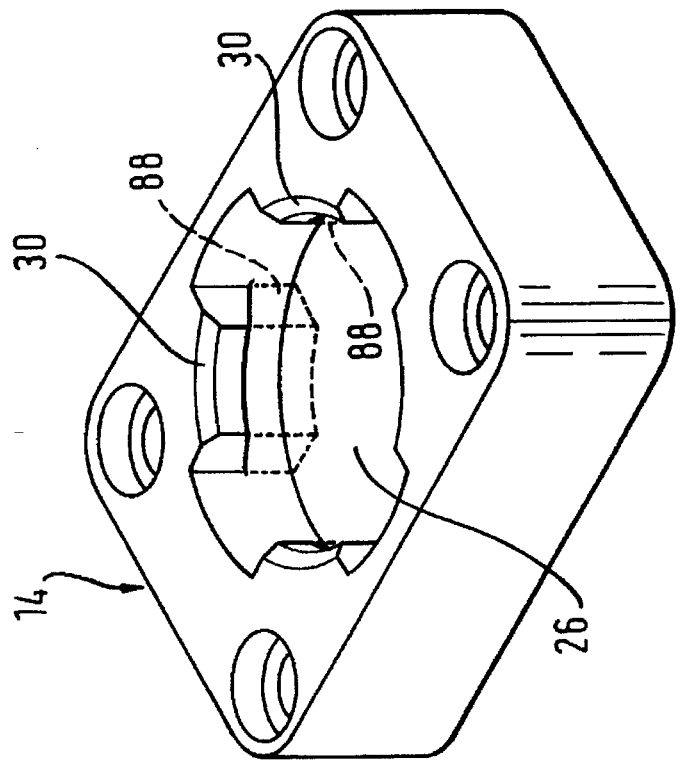

COUPLING ASSEMBLY

FIELD OF THE INVENTION

The invention relates to a coupling assembly with two coupling elements which can releasably be coupled with one another, in a coupling position the two coupling elements being in mutual abutment in a coupling plane with one contact face each, a first one of the coupling elements being provided on its contact face with a recess having at least one undercut and a second one of the coupling elements being provided on its contact face with a trunion having at least one locking projection, the locking projection in the coupled position positively engaging with a wall section that confines the undercut towards the coupling plane, and further, one of the two coupling elements being provided with a securing element which can be displaced between a securing position and a non-securing position and which in its securing position can secure the two coupling elements against uncoupling when the coupling elements are in the coupling position.

BACKGROUND OF THE INVENTION

Such a coupling assembly is, e.g., known from DE 37 10 772 A1. This coupling assembly serves for coupling a trailer coupling part on the tractor vehicle side to a support plate mounted on the tractor vehicle. Using the known coupling assembly one and the same tractor vehicle may be equipped with different trailer coupling parts on the tractor vehicle side at different points of time, i.e. for example a jaw coupling and a ball end coupling may be exchanged. The known coupling assembly is constructed in the manner of a bayonet lock, i.e. in order to bring about coupling a trunion provided with arresting projections, which trunion is positioned on the trailer coupling part on the tractor vehicle side, is introduced into a recess in the support plate, the recess having undercuts, until the trailer coupling part and the support plate are in mutual abutment with respective contact faces, and subsequently, by rotating the trailer coupling part in a substantially orthogonal direction to the contact faces, the arresting projections are caused to positively engage with the wall sections of the support plate which confine the undercuts towards the contact face.

In order to be able to avoid self-actuated uncoupling of the two coupling elements, support plate and trailer coupling part on the tractor vehicle side the known coupling assembly is provided with a securing element in the form of a cap which may be folded over the two coupling elements manually after coupling. It is also possible not to fold this securing cap over the support plate and the trailer coupling part so that coupling can automatically be released when there is sufficiently high torque acting around a direction substantially orthogonal to the contact face.

SUMMARY OF THE INVENTION

As opposed to that it is the object of the invention to provide a coupling assembly of the generic type, wherein self-actuated uncoupling of the two coupling elements is always reliably prevented after coupling of the two coupling elements.

This object is attained in that the securing element is biassed into the securing position and that the securing element can be transferred into the non-securing position by the other coupling element, when the two coupling elements are transferred from an uncoupled position into a ready-for-coupling position, and in that, when the two coupling elements subsequently move from the ready-for-coupling position into the coupling position, the securing element, essentially on reaching the coupling position, is automatically displaced into the securing position, owing to the bias.

In the case of the assembly according to the invention the operator, therefore, need no longer take care that the securing element is properly transferred into its securing position after coupling of the two coupling elements. Rather do the two coupling elements and the bias of the securing element act together during the coupling operation such that the securing element is automatically transferred into its securing position.

The transfer of the securing element into its unlocked position can easily be guaranteed in that it is provided with an abutment face which, when the two coupling elements are transferred from the uncoupled position into the ready-for-coupling position, enters into engagement with a mating abutment face provided on the other coupling element before the ready-for-coupling position is reached, the securing element being displaced from its securing position to its non-securing position by way of the engagement between the abutment face and the mating abutment face during the remaining movement into the ready-for-coupling position.

If the securing element and the other coupling element are provided with securing faces that cooperate with one another when the coupling assembly is in the coupling position and when the securing element is in the securing position, self-actuated uncoupling of the coupling elements may be avoided by a securing element with a simple construction.

In one embodiment the securing element may comprise a bolt which is accommodated in a recess provided in the trunion and which is biassed into the securing position by means of a spring, in particular a helical compression spring, that is also accommodated in this recess, and it may further comprise a displacement lever located on the bolt by means of which the bolt can be displaced into the non-securing position, the bolt engaging with a further recess that is located on the other coupling element, in the securing position, furthermore the securing faces that face each other being formed by the circumferential face of the bolt and the inner periphery of the further recess.

In an alternative embodiment the securing element may comprise a pivoting lever which is biassed into the securing position by means of a spring, in particular a torsion spring, and which engages with a further recess provided on the other coupling element in the securing position.

By providing a locking element by means of which it can be precluded that in the occurrence of the coupling position the securing element is displaced from its securing position, the locking element being displacable between a locking position and a release position, it is possible to provide a second security mechanism to prevent unintentional uncoupling of the coupling elements.

By biassing the locking element into the locking position this second security mechanism can also be reestablished automatically after unintentional release of the locking element from the locking position.

It is possible to achieve that the coupling assembly is easy to handle, in particular during uncoupling of the coupling elements, if the locking element is located on the securing element.

To be able to ensure that also the second securing mechanism is automatically established during coupling of the coupling elements it is suggested in an alternative embodiment that the locking element and the other coupling element be provided with cooperating displacement faces, with the locking element being transferrable from its locking position into its release position by means of the displacement faces when the securing element is displaced from its non-securing position into its securing position, the locking element, essentially on reaching the securing position, automatically returning into the locking position, owing to its bias.

In another alternative embodiment it is suggested that the locking element and the one coupling element be provided with cooperating displacement faces, with the locking element being transferrable from its locking position into its release position by means of the displacement faces when the securing element is displaced from its securing position into its non-securing position, the locking element in the coupling position of the coupling assembly, essentially on reaching the securing position, automatically returning into the locking position, owing to its bias.

If the coupling elements are designed such that for coupling they can be brought together with their coupling faces extending substantially parallel to each other in a direction substantially orthogonal to the coupling plane, the coupling elements can be brought together in the direction in which preferably also force is transmitted between the two coupling elements. In the case of coupling between a support plate mounted on the tractor vehicle and a trailer coupling part on the tractor vehicle side, the trailer coupling part on the tractor vehicle side may be brought near to the support plate in the same direction as is subsequently the drawbar of the trailer.

Constant force transmission between the two coupling elements can be achieved in that, e.g. arresting projections are provided at that end of the trunnion which is remote from the coupling face, which arresting projections are located substantially equidistantly around the circumference of the trunnion and extend at an angle of approx. 45° each.

If one of the coupling elements has a substantially rectangular coupling plate which, in the area of the corners of the rectangle, is designed for being mounted to a higher-ranking constructional unit, and in particular if it is provided with bores to accomodate the fastening bolts, the coupling assembly can be employed in various fields of application in a simple manner without constructive modifications.

An advantageous course of the force lines from the second coupling element into the pertinent higher-ranking constructional unit can be achieved in that the arresting projections of the second coupling element are substantially arranged such that they are facing the corners of the coupling plate in the coupling position.

It is possible to dispense with separate fastening means between the coupling elements and their pertinent higher-ranking constructional units in that the recess and the trunnion, respectively, are integrally formed on at least one of the coupling elements. In this case an especially advantageous course of the force lines between the coupling element and its pertinent higher-ranking constructional unit is obtained.

DESCRIPTION OF THE DRAWINGS

In the following the invention shall be described at the example of some embodiments with reference to the accompanying drawings.

FIG. 1 is a perspective view of a first embodiment of the coupling assembly according to the invention;

FIG. 2 is a sectional view of the embodiment according to FIG. 1;

FIG. 3 is a sectional view taken along the line III—III in FIG. 2;

FIG. 8 is a view analogous to FIG. 1 of a third embodiment of the coupling assembly according to the invention;

FIG. 10 is a view illustrating the manufacture of the two coupling elements of the coupling assembly according to the invention.

DESCRIPTION OF THE EMBODIMENTS

Figure 4:
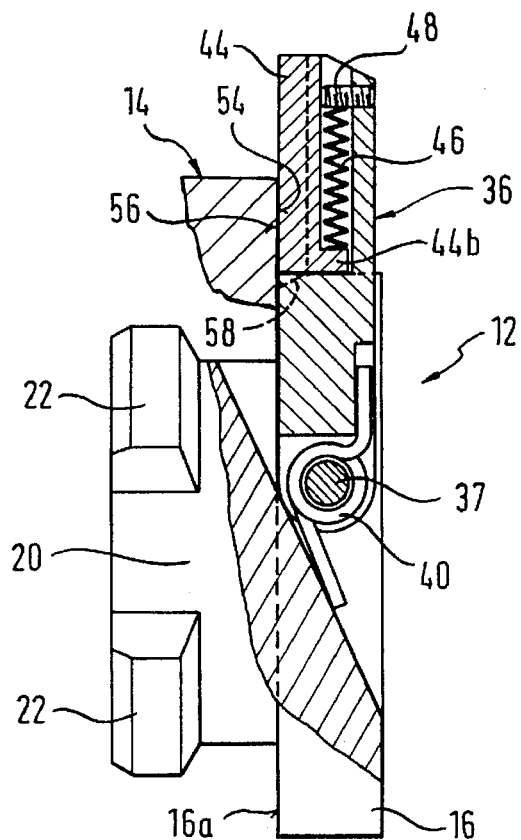
FIG. 4 is a view analogous to FIG. 2 of the coupling element bearing the securing element, the securing element being in its unlocked position.

FIG. 1 shows a first embodiment of the coupling assembly in the following designated as 10, comprising a first coupling element 12 on the tractor vehicle side and a second coupling element 14 on the trailer vehicle side.

The coupling element 12 on the tractor vehicle side has a substantially rectangular support plate 16 which is penetrated by bores 18 in the area of the corners of the rectangle. Fastening bolts (not shown) by means of which the coupling element 12 can be fastened to a frame part (not shown) of a tractor vehicle can be inserted into these bores 18. A substantially cylindrical trunnion 20 projects from a contact face 16a of the support plate 16. At that end of a circumferential face 20a of the trunnion 20 which is remote from the contact face four arresting projections are located substantially equidistantly from one another.

Figure 5:
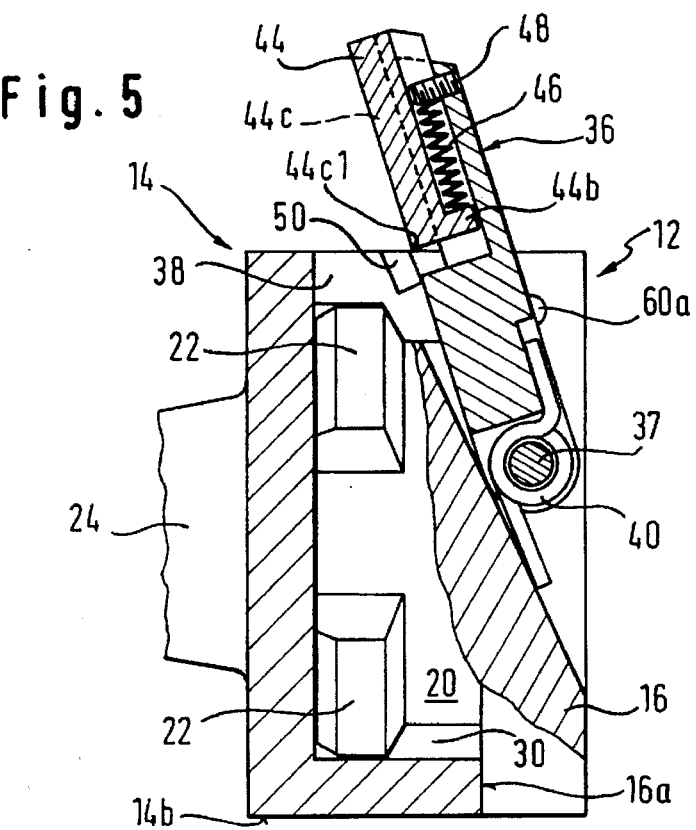
FIG. 5 is a view analogous to FIG. 2, the two coupling elements being in their coupling position and the securing element being shortly before reaching the securing position.

As illustrated in FIG. 1, the second coupling element 14 does not have bores corresponding to the fastening bores 18. Rather is the coupling element 14 integral with its pertinent higher-ranking constructional unit, namely a tractor vehicle side part of a ball head coupling 24. The coupling element 14 has a recess 26 provided with undercuts 28. Towards a contact face 14a of the second coupling element 14 the undercuts 28 are confined by inwardly projecting wall sections 30, the number of which corresponds to the number of arresting projections 22 on the first coupling element. Insertion openings 32 for the arresting projections 22 are provided between the wall sections 30. The wall sections 30 and the insertion openings 32 are arranged such that in the coupling position of the two coupling elements 12 and 14 the arresting projections 22 engage with the wall sections 30 and cooperate with these closingly in terms of shape and force (cf., for example, FIG. 5).

To be able to prevent self-actuated uncoupling of the two coupling elements 12 and 14 in the coupling position, a securing element 36 is located on the first coupling element 12, which securing element can pivot about a pivotal axis 37 between a non-securing position (cf. FIG. 4) and a securing position (cf. FIG. 2). By a torsion spring 40 the securing element 36 is biassed into its securing position so that it automatically returns into this securing position, even if it is unintentionally displaced from its securing position. In the coupling position the securing element engages with a securing recess 38 formed on the second coupling element 14. In this position cooperating securing faces 36a of the securing element 36 and 38a of the securing recess 38 are facing each other and positively secure the two coupling elements 12 and 14 against unintentional uncoupling by rotating.

As a second securing mechanism against self-actuated rotating of the two coupling elements 12 and 14 a locking element 44 is provided on the securing element 36. As can best be gathered from FIG. 3, the locking element 44 is guided on the securing element 36 by means of a dovetail guide 44a/36b. However, other kinds of guidances can be conceived of. The locking element 44 can be displaced with respect to the securing element 36 between a locking position (see FIG. 1, 2 and 4) and a release position (see FIG. 5). As can be gathered, e.g., from FIG. 2, the securing element 44 is biassed into the locking position by means of a helical compression spring 46. On its one end the helical compression spring 46 is supported on a projection 44b of the locking element 44 and on its other end it is supported on a stud screw 48 which is accomodated in a threaded bore 36c in the securing element 36. In the coupled state of the coupling elements 12 and 14 the locking element 44 engages with two locking recesses 50 formed on the second coupling element by means of two edge flanges 44c when the securing element 36 is in the securing position, and locks the securing element against self-actuated release from its securing position.

As described in the following with reference to FIGS. 1, 2, 4 and 5, the securing element 36 and the locking element 44 are automatically transferred into their securing and locking positions, respectively, on coupling of the coupling elements 12 and 14, i.e. without requiring of the operator to take special measures to this end.

In order to couple the two coupling elements the second coupling element 14, starting from a position according to FIG. 2, is first rotated by approx. 45° about an axis A which extends substantially orthogonally to the contact face 14a, for example clockwise. Afterwards the second coupling element 14 is brought near to the coupling element 12, the two contact faces 14a and 16a, at least toward the end of the approaching movement, are in a substantially parallel alignment to one another. Owing to the previously effected rotation of the second coupling element 14a the arresting projections 22 are now facing the insertion openings 32.

Then the trunnion 20 is introduced into the recess 26, the arresting projections 22 engaging with the insertion openings 32. In this case a stop face 54 on the securing element 36, to be more precise on the locking element 44 guided on it, enters into engagement with a mating stop face 56 provided on the second coupling element 14. When the trunnion 20 is introduced into the recess 26, the securing element 36, as a result of this engagement, is caused to pivot against the force of the torsion spring 40 from its securing position illustrated in FIG. 2 into its non-securing position illustrated in FIG. 4.

If the two contact faces 14a and 16a are in abutment, the second coupling element 14 is then again rotated by approx. 45°, for example anti-clockwise, so that the arresting projections 22 engage with the wall sections 30 closingly in terms of shape and force. During this rotation also the securing recess 38 reaches a position facing the securing element 36 so that the securing element 36 is now able to pivot into the securing position due to the bias of the spring 40, i.e. anti-clockwise in FIG. 5. In this position the securing element 36 positively secures the coupling elements 12 and 14 against unintentional uncoupling by rotating.

During the pivotal movement of the securing element 36 into the securing recess 38 lower edges 44c1 of the edge flanges 44c of the locking element 44 enter into engagement with upper peripheral faces 38b of the securing recess 38. As it is thus not possible for the locking element 44 to rotate on a circular path about the pivotal axis 37 of the securing element 36, it is displaced against the force of the spring 46 from its locking position according to FIG. 4 into its release position according to FIG. 5 when the securing element 36 pivots into its securing position. After the securing element 36 has reached its securing position, the edge flanges 44c of the locking element 44 are facing the arresting recesses 50 so that the locking element snaps into these arresting recesses 50 owing to the bias of the the spring 46. In this position the locking element 44 locks the securing element 36 against displacement from its securing position into its non-securing position, thus constituting a second securing mechanism against unintentional uncoupling of the coupling assembly 10.

For uncoupling an operator merely has to grasp the securing element 36 with one hand, e.g. acting with his thumb on the locking element 44 from where the abutment face 54 is. With his thumb he may then transfer the locking element 44 out of the arresting recesses 50, against the force of the spring 46, from its locking position into its release position according to FIG. 5 and then displace the securing element 36 opposite to the force of the spring 40 from its securing position into its non-securing position according to FIG. 4. With his other hand the operator can grasp the second coupling element 14 and its pertinent higher-ranking construcional unit, respectively, e.g., the ball head coupling 24, and rotate it by 45° about the axis A which extends orthogonally to the contact face 14a. Afterwards he may let go the securing element 36 and separate the second coupling element 14 from the first coupling element 12.

It results from what is set out above that both during coupling and uncoupling the course of the steps to be taken is ergonomically favourable. Namely, besides bringing near the second coupling element 14 to the first coupling element 12, merely two rotational movements by 45° have to be performed during coupling, while it is possible that one of them is performed e.g. clockwise and the other anti-clockwise. These roatational movements are within the rotational capacity of the human wrist so that they do not entail special effort on the part of the operator. As the securing element 36 as well as the locking element 44 can automatically be transferred into their securing and locking positions, respectively, during coupling, the coupling operation can be performed with one hand.

In the case of uncoupling the double securing mechanism effected by the locking element 44 and the securing element 36 as described above can easily be released by hand, whereas actual uncoupling of the two coupling elements 12 and 14 then again can be brought about by two simple rotational movements by approx. 45° and, to be performed in between, pulling the coupling element 14 off the coupling element 12.

It has to be added that the first coupling element 12 is provided with climbing ramps 58 (cf. FIG. 2 and 4) which allow for pivoting the securing element 36 into its non-securing position, without the edge flanges 44c of the locking element 44 interfering with the contact face 16a of the first coupling element 12 in this regard.

As the coupling element 14 is integral with its pertinent higher-ranking constructional unit 24, it can have a substantially cylindrical circumferential face 14b which in no place projects beyond the contour of the support plate 16 of the first coupling element during coupling.

In order to be able to protect the coupling assembly in the coupled state against theft of the second coupling element 14 and its pertinent higher-ranking constructional unit, the first coupling element 12 may be provided with a lock 60 (see FIG. 1), whose locking pin 60a (see FIG. 2) can engage the securing element 36 from behind in its securing position and in this position prevents the securing element 36 from being pivoted out of its securing position by unauthorized persons in order to uncouple the coupling assembly.

In case it is not intended that a second coupling element 14 with a pertinent constructional unit 24 be coupled with the first coupling element 12, a protective cover (not shown) can be placed on the first coupling element 12 to prevent it from soiling.

Figure 6:
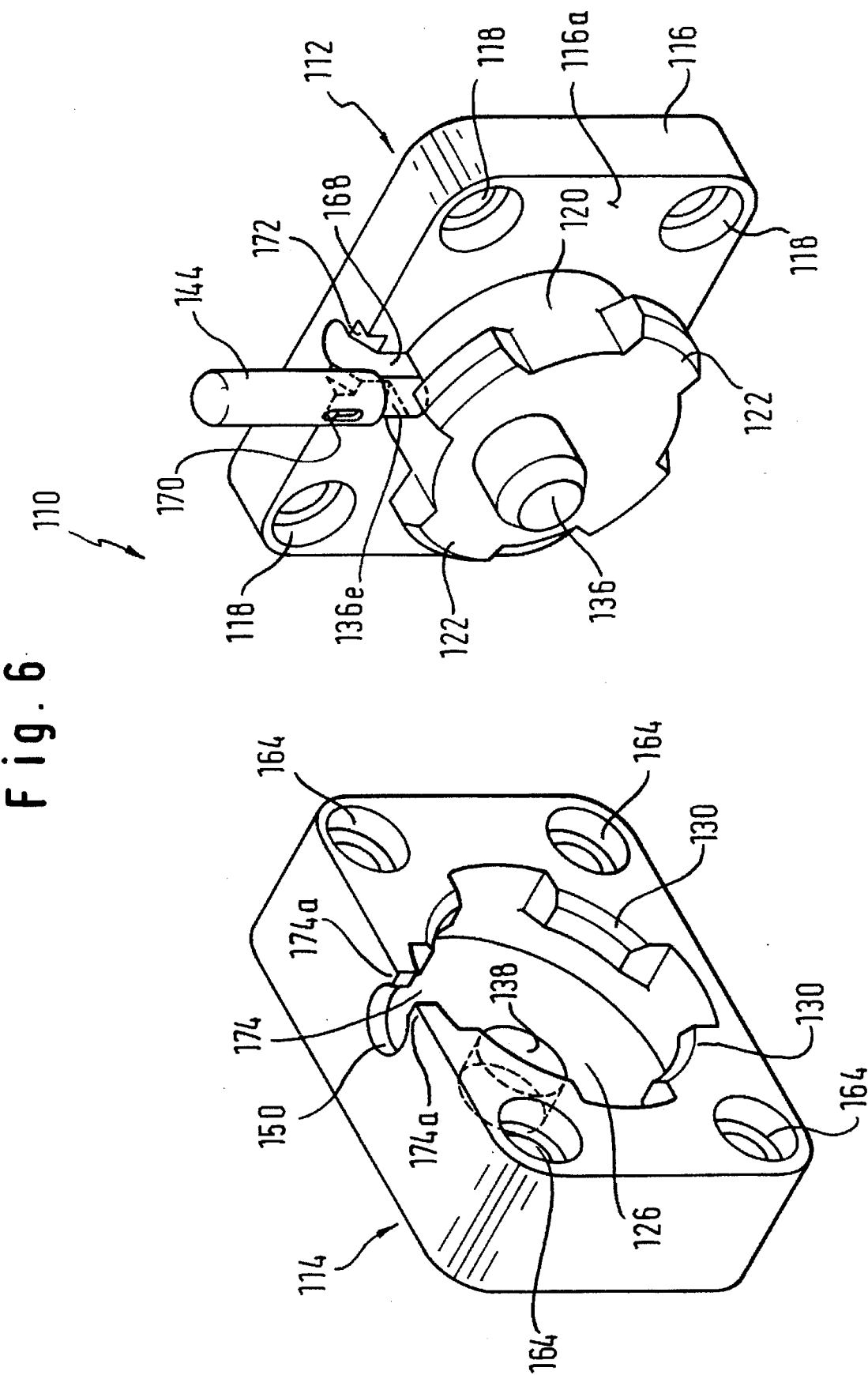
FIG. 6 is a view analogous to FIG. 1 of a further embodiment of the coupling assembly according to the invention.

FIG. 6 shows a further embodiment of the coupling assembly according to the invention, substantially corresponding to the embodiment shown in FIGS. 1 to 5. Consequently, analogous parts are referred to by the same reference numbers, however increased by the number 100. In the following the embodiment according to FIG. 6 is described only in so far as it differs from the embodiment according to FIGS. 1 to 5. Furthermore, explicit reference is made to the description of the embodiment acccording to FIGS. 1 to 5.

The coupling assembly 110 according to FIG. 6 is different from the embodiment according to FIGS. 1 to 5, first in that apart from the first coupling element 112 also the second coupling element 114 is provided with bores 164 to accomodate fastening bolts (not shown) to be mounted to its pertinent higher-ranking constructional unit. According to FIG. 6 the securing element 136 and the locking element 144 are designed differently than in the case of the embodiment according to FIGS. 1 to 5.

Figure 7:
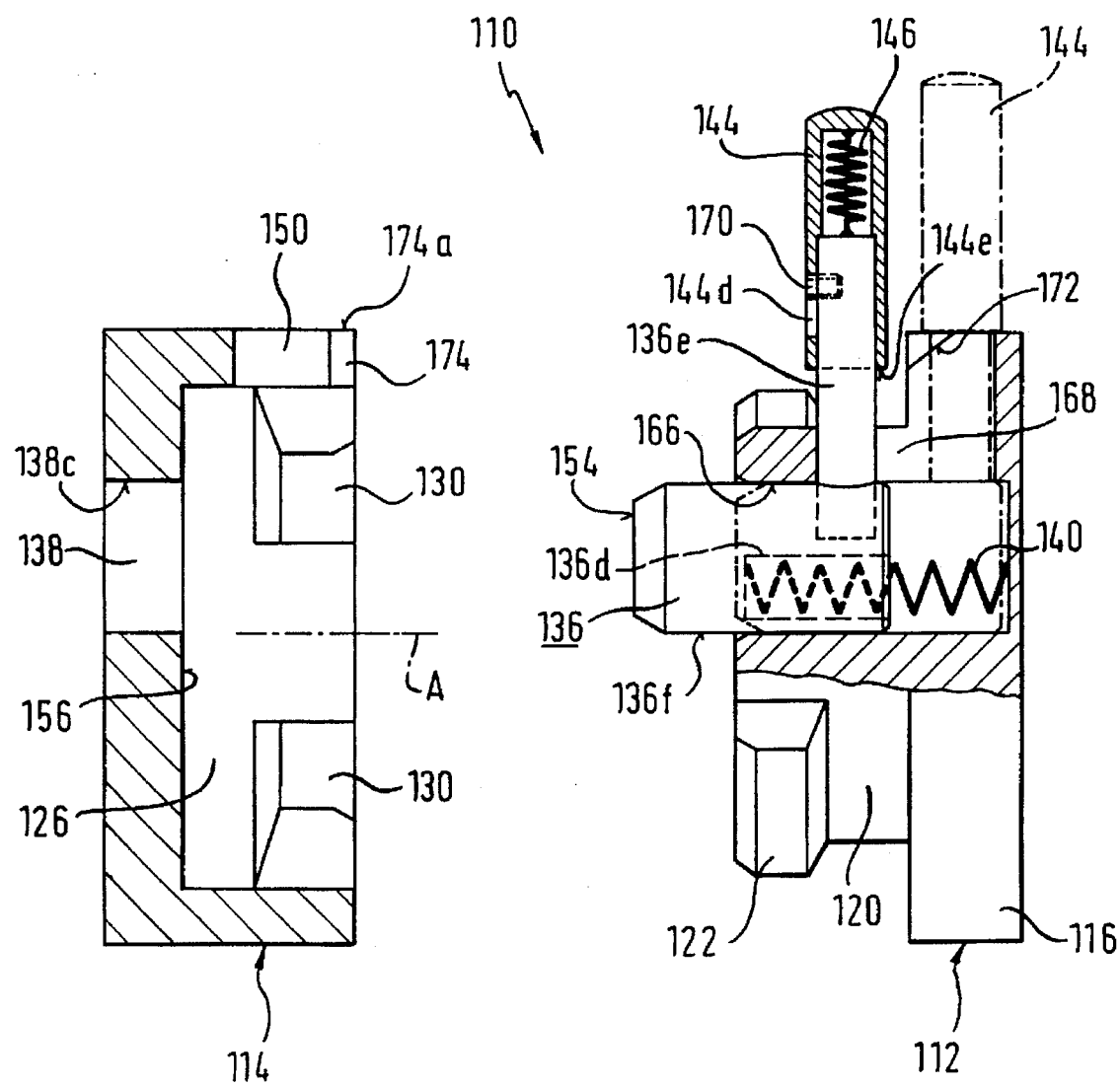
FIG. 7 is a view analogous to FIG. 2 of the embodiment according to FIG. 6.

It can be gathered particularly from FIG. 7 that in the coupling assembly 110 the securing element is formed by a bolt 136 which is guided in a guiding bore 166 provided in the trunnion 120. In the guiding bore 166 the securing bolt 136 can be displaced between a securing position (shown in continuous lines in FIG. 7) and an non-securing position (shown in dash-dotted lines in FIG. 7). The securing bolt 136 is biassed into the securing position by a helical compression spring 140 which at its one end is supported on the support plate 116 and on its other end on the bottom of a pocket hole 136d provided in the securing bolt 136. The movement of the securing bolt 136 out of the guiding bore 166 is limited by a limiting lever 136e fastened to the securing bolt 136. The limiting lever 136e is guided in a guiding slot 168 formed in the trunnion 120 and the support plate 116.

If the coupling elements 112 and 114 are in the coupled state, the securing bolt 136, when in its securing position, engages with a securing recess 138 of the second coupling element 114. In this position the coupling assembly 110 is protected against unintentional uncoupling, on account of a cooperation between the inner periphery 138c of the securing recess 138 on the one hand and the outer periphery 136f of the securing bolt 136 on the other, the inner periphery 138c and the outer periphery 136f serving as securing faces.

The locking element 144, which is designed as a hollow cylinder in this embodiment, is telescopically guided on the limiting lever 136e. Relative to the limiting lever 136 the locking element 144 can be be displaced between a locking position (shown in FIG. 7 in continuous lines) and a release position (shown in FIG. 7 in dash-dotted lines). Displacement between these two positions is limited by a pin 170 which is located on the limiting lever 136e and guided in a longitudinal slot 144d formed in the locking element 144. By means of a helical traction spring 146 the locking element 144 is biassed into its locking position.

When the trunnion 120 is introduced into the recess 126 the front face of the bolt 136, which face serves as an abutment face 154, gets into abutment with the mating abutment face 156 at the bottom of the recess 126 in the coupling element 144. This is possible, since at this time the two coupling elements 112 and 114 are rotated relatively to one another by approximately 45°. On further bringing the two coupling elements 112 and 114 together the securing bolt 136 is displaced to the right into its non-securing position by means of the engagement of the two faces 154 and 156, against the force of the spring 140 in FIG. 7. In this connection a lower edge 144e in FIG. 7 of the locking element 144 comes into engagement with inclined climbing faces 172 of the support plate 116. This causes a displacement of the locking element 144 from its locking position (shown in FIG. 7 in continuous lines) into its release position (shown in FIG. 7 in dash-dotted lines) due to the securing bolt 136 moving into its unlocked position, against the force of the spring 146.

After the two coupling elements 112 and 114 have been transferred into their coupling position by rotation by 45°, i.e. after the arresting projections 122 have been brought into engagement with the wall sections 130, the securing recess 138 is arranged relatively to the securing bolt 136 such that the latter can be transferred into its securing position by the bias of the spring 140, i.e. the securing bolt 136 can engage with the securing recess 138. Thereby the limiting lever 136e enters a guiding slot 174 which is formed on the second coupling element 114, the lower edge 144e of the locking element 144 gliding on abutment faces 174a which prevent its entering its locking position as a result of the bias of the spring 146.

In the direction of the movement of the securing bolt from its non-securing position into its securing position the guiding slot 174 opens towards a locking recess 150 having a substantially circular cross-section. The diameter of the recess 150 has a slightly higher value than the outside diameter of the locking element 144 so that, when the securing element 136 has reached its securing position, the locking element may be put in the locking recess 150 due to the bias of the spring 146, thus locking the securing element 136 in its securing position.

The width of the guiding slot 174 has a value that is slightly higher than the diameter of the limiting lever 136, however smaller than the diameter of the securing element 144. Although it is thus possible to always move the limiting lever 136e through the guiding slot 174, the securing element 144 cannot be released from its locking position, wherein it is put in the locking recess 150, by force acting in the direction of the movement performed when the securing element 136 is displaced between its securing position and its non-securing position.

Also in the case of this embodiment ergonomically favourable operation of the coupling assembly 110 is achieved, to be more precise both during coupling and uncoupling. With regard to coupling reference is made to the statements made in connection with the description of the embodiment shown in FIGS. 1 to 5. For uncoupling the operator has to grasp the cylindrical locking element 144 and disengage it from the locking recess 150 in the direction of its cylinder axis in FIG. 7, against the force of the spring 146 in an upward direction, and afterwards move it substantially orthogonally to this towards the contact face 116a of the coupling element 112 in order to transfer the securing element 136 from its securing position into its non-securing position. With his other hand the operator may subsequently uncouple the two coupling elements 112 and 114 as described above.

As both on the coupling element 112 and the coupling element 114 fastening bores 118 and 164, respectively, are provided according to the embodiment of FIGS. 6 and 7, the coupling assembly 110 may easily be employed as an adapter between different "hole patterns". Accordingly, e.g. the fastening bores 118 may be furnished on the support plate 116 in the manner of the hole pattern that is common in Germany so that the coupling element 112 can be mounted on a vehicle that is registered in Germany. In contrast thereto, the fastening bores 164 may be furnished on the coupling element 114 according to the hole pattern that is common in Japan. Thus, a trailer coupling that is customary in trade in Japan can be mounted on the coupling element 114 and then again, via the coupling element 112, it can easily be mounted on the vehicle that is registered in Germany.

FIG. 8 illustrates a further embodiment of the coupling assembly according to the invention, substantially corresponding to the embodiment illustrated in FIGS. 6 and 7. Therefore, analogous parts are referred to by the same reference numbers as used in FIGS. 1 to 5, however, increased by the number 200. In the following the coupling assembly 210 is described only in so far as it differs from the embodiments described above. Furthermore, explicit reference is made to the description of these embodiments.

The coupling assembly 210 differs from the embodiment according to FIG. 6 only in that in the area of its lower edge 244e the locking element 244 is shaped differently and also in that the faces and recesses cooperating with the latter, which faces and recesses are provided on the coupling elements 212 and 214, are shaped differently.

Figure 9:
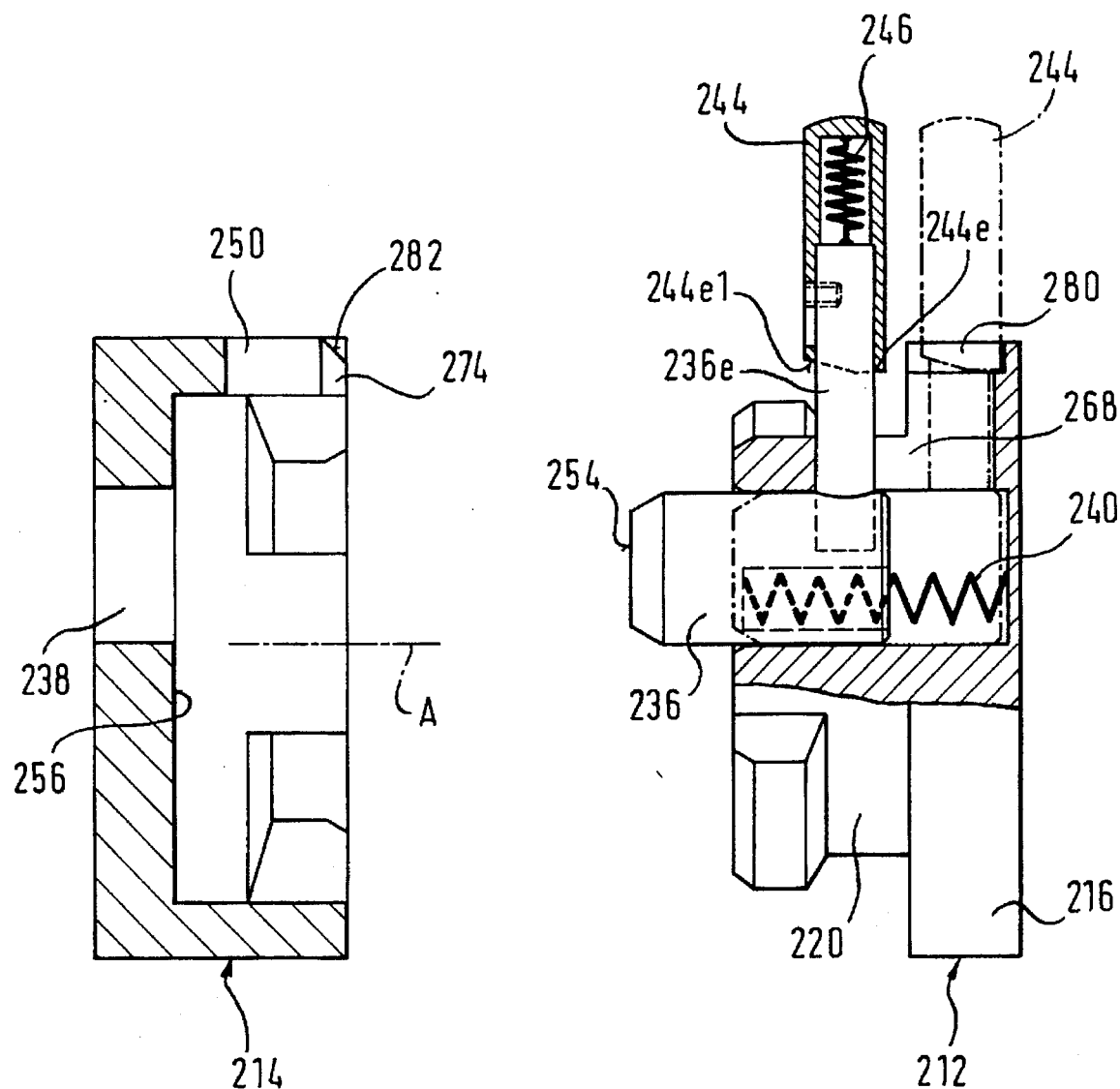
FIG. 9 is a view analogous to FIG. 2 of the embodiment according to FIG. 8.

In contradistinction to the embodiment according to FIG. 6 the support plate 216 is not provided with climbing faces corresponding to the climbing faces 172 in the area of the guiding slot 268, but rather is there a step-like shoulder 280 surrounding the guiding slot 268. On moving the securing bolt 236 from its securing position (shown in FIG. 9 in continuous lines) into its non-securing position (shown in FIG. 9 in dash-dotted lines) the lower edge 244e of the locking element 244 is accomodated in the shoulder 280, the locking element 244 remaining in its locking position.

At that section of the lower edge 244e of the locking element 244 which faces the coupling element 214 during coupling there is formed a climbing ramp 244e1. When the coupling elements 212 and 214 are in the coupled state these climbing ramps 244e1 cooperate with inclined climbing faces 282 on a displacement of the securing bolt 236 from its unlocked position to its securing position. The climbing faces 282 are provided on the projections 284 on the second coupling element 214, which define the guiding slot 274 for the limiting lever 236e, in order to transfer the locking element 244 from its locking position into its release position, opposite to the force of the spring 246. After the securing element 236 has reached its securing position, wherein it engages with the securing recess 238, the climbing faces 282 will be disengaged from the lower edge 244e of the locking element 244 and the latter is transferred into its locking position by means of the force of the spring 246. In this position it engages with the locking recess 250 and in that it cooperates with the projections 284 it prevents the locking element 244 from being unintentionally displaced from this position.

Uncoupling of the embodiment according to FIG. 8 follows the same route as in the case of the embodiment according to FIG. 6.

All of the three embodiments mentioned above are characterized in that they can easily be manufactured. During moulding and forging, respectively, of the coupling elements 12 and 14 the arresting projections 22 on the trunnion 20 of the first coupling element as well as the wall sections 30 projecting into the recess 26 of the second coupling element may be shaped as continuous cams 88, as shown in FIG. 10 in dashed lines. The arresting projections 22 and the wall section 30, respectively, can then be worked out from these cams 88 in a subsequent simple lathe tool processing step. Also further processing of the coupling elements requires only simple drilling and cutting processing steps, respectively.

Further, it has to be noted that in the embodiments according to FIGS. 1 to 5 and 8 and 9, respectively, the springs 46 and 246, respectively, have to be designed weaker than the springs 40 and 240, respectively, since in these embodiments the locking element 44 and 244, respectively, has to be transferred from its locking position into its release position against the force of the spring 46 and 246, respectively, when the securing element 36 and 236, respectively, is moved from its non-securing position into its securing position as a result of the biassing force of the spring 40 and 240, respectively, in order to ensure proper function of the double securing mechanism. In the embodiment according to FIGS. 6 and 7, however, both springs 140 and 146 are tensioned by the operator during coupling, to be more precise, as soon as the securing bolt 136 is displaced from its securing position to its non-securing position due to the engagement of the faces 154 and 156, the locking element 144 thus gliding on abutment faces 172 and being transferred from its release position into its locking position.

All the embodiments shown can preferably be employed for mounting trailer coupling parts on the tractor vehicle side (e.g. the ball head coupling 24) to a tractor vehicle. In this connection they are characterized in that they require little space, as the second coupling element is brought near to the first coupling element from the same direction as a drawbar of a trailer is brought near to the coupling assembly afterwards. Sufficient space to move has to be provided anyway in this direction. However, the coupling assemblies described can also advantageously be used to mount different trailer coupling rings on the drawbar of a trailer. In this case the trailer coupling ring again may be designed such as to be either screw fitted with one of the coupling elements or integral with the latter.

The coupling assemblies according to the invention may be mounted on the higher-ranking constructional units in any desired three-dimensional plane, since the major forces acting between the coupling elements 12 and 14 are always transmitted via the wall sections 30 and the arresting projections 22. Consequently, the first coupling element 12, viewed from, e.g., the direction of motion, can be mounted with a trunnion 20 that points to the right, to the left, backwards or downwards.

Finally, the coupling assemblies according to the invention are not only suited for mounting trailer couplings. Rather is it possible that they are employed to mount additional units, e.g. a bicycle rack, on a vehicle. Also applications in fair construction, in construction kit systems and the like, can be conceived of. To bring about an articulated connection between two constructional units the two coupling elements may be provided with matching socket sections. When the coupling elements are in the coupled state these socket sections form a ball socket to pivotally accommodate a ball which is located on one of the coupling elements.

I claim:

1. A coupling assembly, comprising:

a first coupling element and a second coupling element releasably couplable with each other;

said first and second coupling elements each having a respective contact face and, in a coupled position, are in mutual abutment with said respective contact faces in a coupling plane;

said first coupling element having on its respective contact face a recess provided with at least one undercut;

said second coupling element having on its respective contact face a trunnion provided with a plurality of spaced apart arresting projections;

said plurality of arresting projections of the second coupling element, in the coupled position of said first and second coupling elements, positively cooperating with a wall section confining the undercut of the first coupling element towards the coupling plane;

said first and second coupling elements, in a ready-for-coupling rotational position with respect to an axis of rotation orthogonal to the coupling plane, being approachable towards each other in the direction of the axis of rotation until the respective contact faces abut each other, in which ready-for-coupling rotational position the plurality of arresting projections of the second coupling element and the wall section of the first coupling element do not overlap, and being rotatable relative to each other about the axis of rotation for establishing a positive overlapping of the plurality of arresting projections of the second coupling element and the wall section of the first coupling element, for bringing about the coupled position of said first and second coupling elements;

a securing element provided on one of the first and second coupling elements, said securing element having a spring, said securing element being displaceable between a securing position and a non-securing position and, in the securing position, securing the first and second coupling elements in the coupled position against uncoupling relative rotation;

the securing element having an abutment face which, in the course of an approaching motion of the first and second coupling elements in the direction of the axis of rotation, is engaged by the other of the first and second coupling elements and, following the further course of the approaching motion, causes a transfer of the securing element from the securing position to the non-securing position against the force of the spring;

said other coupling element being provided with a securing recess into which the securing element snaps due to the action of the force of the spring upon relative rotation of said first and second coupling elements about the axis of rotation to the coupled position; and a locking element mounted on the securing element and being movable between a locking position and a release position and being biased into the locking position, said locking element, in the coupled position of the first and second coupling elements, preventing the displacement of the securing element out of the securing position.

2. The coupling assembly according to claim 1, wherein the securing element and the other coupling element are provided with securing faces that cooperate with one another when the first and second coupling elements are in the coupled position and when the securing element is in the securing position and that prevent self-actuated uncoupling of the coupling elements.

3. The coupling assembly according to claim 2, wherein the securing element comprises a bolt which is accommodated in a bolt recess provided in the trunnion and which is biased into the securing position by means of said spring, which spring is also accommodated in the bolt recess, a displacement lever is located on the bolt, by means of which the bolt is displaceable into the non-securing position, the bolt engaging with said securing recess located on the other coupling element, and the securing faces that cooperate with one another are formed by a circumferential face of the bolt and an inner periphery of said securing recess.

4. The coupling assembly according to claim 3, wherein said spring is a helical compression spring.

5. The coupling assembly according to claim 1, wherein the securing element comprises a pivoting lever which is biased into the securing position by said spring and which engages with said securing recess of the other coupling element in the securing position of said securing element.

6. The coupling assembly according to claim 5, wherein said spring is a torsion spring.

7. The coupling assembly according to claim 1, wherein the securing element is pivotally supported about a pivotal axis.

8. The coupling assembly according to claim 7, wherein the securing element, in its securing position, simultaneously abuts against guide surfaces of said securing recess and guide surfaces of a guiding recess which is traversed by the pivotal axis.

9. The coupling assembly according to claim 1, wherein the locking element and the other coupling element are provided with cooperating displacement faces, the locking element being transferable from its locking position to its release position by means of the displacement faces when the securing element is displaced from its non-securing position into its securing position, the locking element, essentially upon the securing element reaching the securing position, automatically returning to the locking position owing to said bias towards the locking position.

10. The coupling assembly according to claim 1, wherein the locking element and the one coupling element are provided with cooperating displacement faces, the locking element being transferable from its locking position to its release position by means of the displacement faces when the securing element is displaced from its securing position to its non-securing position, and the locking element in the coupled position of the first and second coupling elements, essentially upon the securing element reaching the securing position, automatically returning to the locking position owing to said bias towards the locking position.

11. The coupling assembly according to claim 1, wherein the first and second coupling elements are configured such that for coupling they can be brought together with their contact faces extending substantially parallel to each other in a direction substantially orthogonal to the axis of rotation.

12. The coupling assembly according to claim 1, wherein four arresting projections are provided on an end of the trunnion which is remote from the contact face of said second coupling element, which arresting projections are located substantially equidistantly around the circumference of the trunnion and extend at an angle of approximately 45° each.

13. The coupling assembly according to claim 12, wherein at least one of the first and second coupling elements has a substantially rectangular coupling plate which, in the area of the corners of the rectangle, is configured to be mounted to a higher-ranking constructional unit, and which is provided with bores to accommodate fastening bolts.

14. The coupling assembly according to claim 13, wherein the arresting projections of the second coupling element are substantially arranged such that they are facing the corners of the coupling plate in the coupled position of said first and second coupling elements.

15. The coupling assembly according to claim 1, wherein at least one of the recess and the trunnion is integrally formed on the respective element.

* * * * *